United States Patent [19]

Goodzeit et al.

[11] Patent Number: 5,058,835
[45] Date of Patent: Oct. 22, 1991

[54] WHEEL SPEED MANAGEMENT CONTROL SYSTEM FOR SPACECRAFT

[75] Inventors: Neil E. Goodzeit, East Windsor, N.J.; David M. Linder, Doylestown, Pa.

[73] Assignee: General Electric Company, East Windsor, N.J.

[21] Appl. No.: 535,675

[22] Filed: Jun. 11, 1990

[51] Int. Cl.$^5$ .............................................. B64G 1/28
[52] U.S. Cl. ..................................... 244/165; 244/171
[58] Field of Search ............... 244/164, 165, 171, 176; 364/432, 434, 459

[56] References Cited

U.S. PATENT DOCUMENTS 3,741,500 6/1973 Liden ................................. 244/165
4,071,211 1/1978 Muhlfelder et al. ............. 244/171 X

FOREIGN PATENT DOCUMENTS 0018198 1/1990 Japan ................................. 244/164

OTHER PUBLICATIONS

Ramos, "Air Bearing Testing of a Skewed Reaction Wheel System for Attitude Control," Comstat Tech Review, vol. 9, No. 1, Spring 1979.

Primary Examiner—Joseph F. Peters, Jr.
Assistant Examiner—Carla Mattix
Attorney, Agent, or Firm—William H. Meise

[57] ABSTRACT

A spacecraft attitude control system uses at least four reaction wheels. In order to minimize reaction wheel speed and therefore power, a wheel speed management system is provided. The management system monitors the wheel speeds and generates a wheel speed error vector. The error vector is integrated, and the error vector and its integral are combined to form a correction vector. The correction vector is summed with the attitude control torque command signals for driving the reaction wheels.

6 Claims, 6 Drawing Sheets

WHEEL SPEED MANAGEMENT CONTROL SYSTEM FOR SPACECRAFT

The invention described herein was made in the performance of work under NASA Contract No. NAS5-32000 and is subject to the provisions of Section 305 of the National Aeronautics and Space Act of 1958, as amended (72 STAT. 435; 42 USC 2457).

BACKGROUND OF THE INVENTION

This invention relates to attitude control of spacecraft, and more particularly to the redistribution of net stored momentum in a spacecraft having four or more reaction wheels or momentum wheels.

Orbiting spacecraft are used for a large variety of sensing and communication purposes. For photographic purposes, it may be desirable for the spacecraft to be relatively near the Earth, so that the cameras or sensors are close to the subjects. For communication purposes, a geosynchronous equatorial orbit is often desirable. Whatever the orbit, a satellite must be stabilized in space if the sensors or antennas are to be pointed in appropriate directions.

Spacecraft attitude stabilization may be accomplished by spinning the spacecraft and by mounting the sensors or antennas on a despun platform. Alternatively, the spacecraft may be stabilized in three axes. Three-axis stabilization may be accomplished by a control system using fuel-burning thrusters, but the use of such thrusters requires the expenditure of fuel, which tends to limit the service life of the spacecraft. Another method for three-axis stabilization uses magnetic coils or torquers which interact with the magnetic fields of the heavenly body providing the desired torques. Magnetic torquers have the disadvantages that the available torques tend to be small, and undesirably dependent upon the local magnitude of the magnetic field of the heavenly body being orbited. The magnetic fields change from time to time and from location to location. The salient advantage of magnetic torquers, however, is that their operation requires only electrical energy, which may be a renewable resource on spacecraft equipped with solar panels.

Larger torques than those available by the use of magnetic torquers may be achieved with electrically driven reaction wheels or momentum wheels. Such wheels are also electrically driven and have the advantage of being able to provide relatively large torques regardless of orbital position.

In principle, a three-axis stabilized spacecraft requires only three mutually orthogonal reaction wheels or momentum wheels (referred to as "reaction wheels" or "wheels" hereinafter). In order to provide for redundancy in the event that one of three orthogonal wheels should fail, spacecraft often include at least one additional reaction wheel, oriented at a skew angle relative to the other three. The fourth wheel provides redundancy for all three wheels because it provides momentum components along the three axes. Thus, the skew reaction wheel may be used in conjunction with two of the other wheels to control the spacecraft attitude.

Increased expectations relating to the performance of spacecraft and improved capabilities have led to a continuing increase in the size of spacecraft. The increased size in turn requires greater torque and momentum capability along each control axis. Rather than use three larger mutually orthogonal reaction wheels with a skew wheel, it has been found that there are advantages to using four or more skewed smaller reaction wheels to obtain the required momentum and torque. When four or more reaction wheels are used, modern control techniques utilize all the wheels during operation.

When four or more reaction wheels are used for control, a given net momentum of the wheels may be achieved by many different wheel speed combinations, i.e., the three body momentum components are mapped into an infinite number of wheel momentum combinations.

During attitude control operations, the various reaction wheels are accelerated and decelerated to apply torques to the spacecraft body. For a given total spacecraft momentum, each wheel speed will drift from its optimal value, because of the under-determined nature of the wheel control, thereby increasing the total power consumption. In the worst case, a wheel may reach its maximum speed, even though the total wheel stored momentum is small.

A prior art speed management arrangement allows the wheel speeds to drift from their power optimal values and monitors the speed of each reaction wheel. When one of the reaction wheels reaches a predetermined speed threshold, it is shut off. This wheel's speed decreases to zero due to friction, and the wheel's momentum is redistributed to the other operational wheels. In this process a disturbance is applied to the spacecraft. This disturbance is the friction torque of the disabled wheel. This torque results in an attitude error.

A wheel speed management arrangement is desired that maintains each wheel at its power optimal speed without imparting a disturbance to the spacecraft.

SUMMARY OF THE INVENTION

A spacecraft includes an attitude control sensing means for generating attitude signals which are representative of the three-axis attitude of the spacecraft. At least four reaction wheels or reaction wheel assemblies (RWA) receive torque drive signals for torquing the spacecraft. An attitude controller is coupled to the attitude control sensor for processing at least the attitude signals in order to generate torque command signals, which represent the body torques required to control the spacecraft's attitude. A coupling arrangement is coupled to the attitude controller and to the reaction wheels for translating signals from the attitude controller to the reaction wheels. The coupling arrangement includes a summer with first and second input data ports and a sum output port. The first input data port is coupled to the attitude controller for receiving the torque command signals, and the sum output port is coupled to the wheels. The coupling arrangement further includes a wheel speed control arrangement coupled to the wheels for sensing the speeds of the wheels. The coupling arrangement processes the wheel speed signals and the torque command signals to produce wheel speed management signals. The wheel speed management signals are applied to the second input data port of the summer to be summed with the torque command signals to produce the torque drive signals for control of the wheels. In a particular embodiment of the invention, the coupling arrangement further includes a wheel speed error signal generator coupled to the wheels and responsive to the wheel speeds for generating error signals representative of the wheel speed error vector, which represents each wheel's speed deviation from its power optimal value. An integrator is coupled to the wheel speed error signal generator for integrating the error signals to produce integrated signals. A processor is coupled to the wheel speed error signal generator and to the integrator for processing the error signals and the integrated signals to produce the wheel speed management signals. The processor may include a linear combiner for linearly combining the error signals and the integrated signals.

DESCRIPTION OF THE INVENTION

Figure 1:
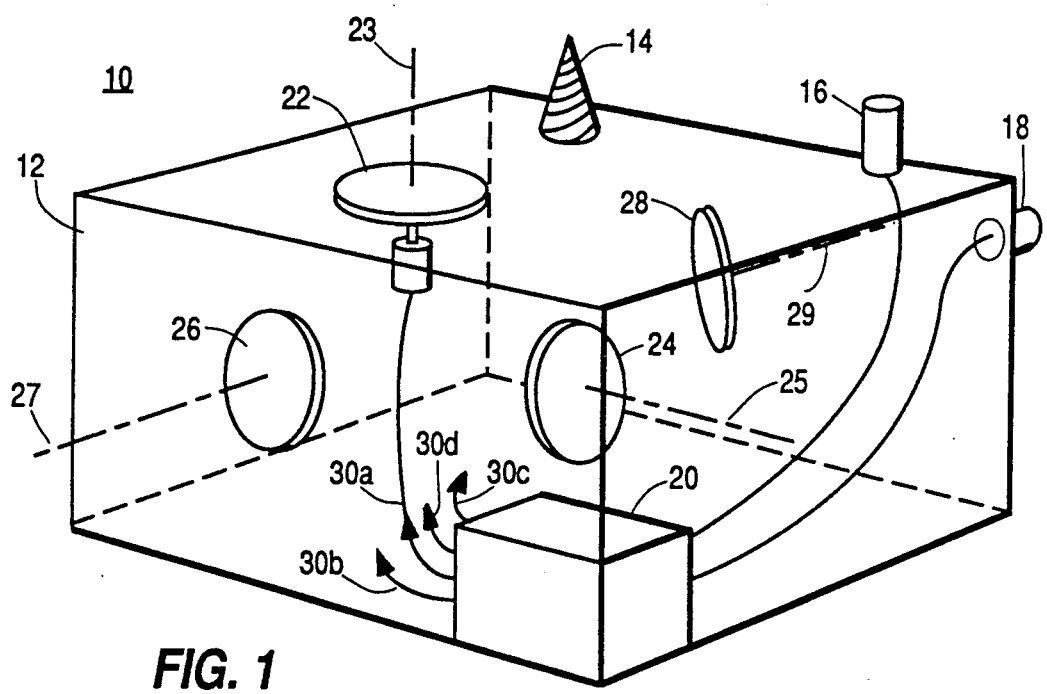
FIG. 1 is a perspective or isometric view of a spacecraft, illustrating the locations of various reaction wheels, sensors and controllers associated with the invention.

FIG. 1 is a perspective or isometric view of a spacecraft 10 including a body 12 and a payload illustrated as an omnidirectional conical spiral helix antenna 14. A polar star sensor illustrated as 16 is adapted for producing roll and yaw signals as described 0 in conjunction with U.S. patent application Ser. No. 07/511,169 filed Apr. 19, 1990 in the name of Paluszek. A pitch or pitch-and-roll sensor 18 is also mounted on body 12, and both sensors are connected by data paths to a controller illustrated as a block 20. Pitch, roll and yaw reaction wheels, 22, 24, and 26, respectively, rotate about mutually orthogonal pitch, roll and yaw axes 23, 25, and 27, respectively. A fourth reaction wheel 28 rotates about an axis 29 which is skewed relative to the pitch, roll and yaw axes. Reaction wheels 22, 24, 26 and 28 are coupled to controller 20 by data paths, only data path 30a of which is illustrated. The data paths provide for communication of wheel speed information to controller 20 and for the coupling of drive signals to the reaction wheels.

Figure 2:
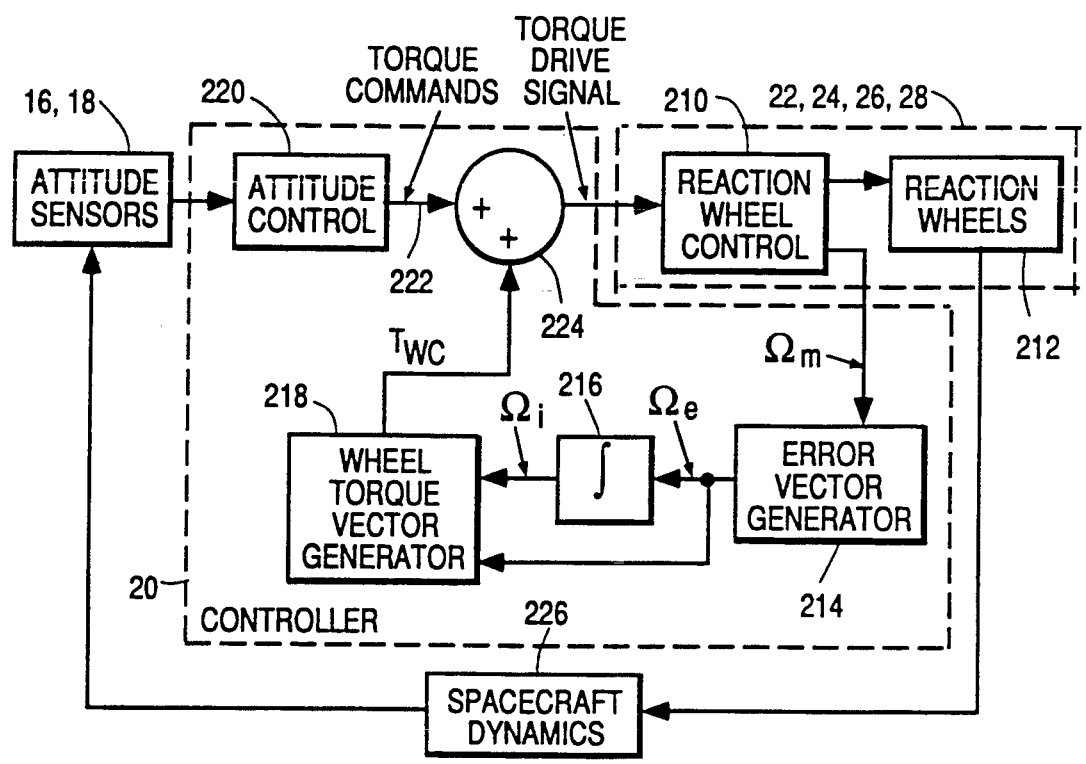
FIG. 2 is a simplified block diagram illustrating a system according to the invention.

FIG. 2 is a simplified block diagram of a spacecraft attitude control system including a wheel speed management system in accordance with the invention. Elements of FIG. 2 corresponding to those of FIG. 1 are designated by the same reference numerals. In FIG. 2, reaction wheels 22, 24, 26 and 28 of FIG. 1 are illustrated together as a dash-line block. As illustrated in blocks 22, 24, 26 and 28 of FIG. 2, the reaction wheels include reaction wheel control electronics illustrated as a block 210 and the reaction wheel themselves, illustrated as a block 212. Reaction wheel control block 210 drives reaction wheel block 212, and also produces wheel speed indication signals, designated jointly as vector $\Omega_m$. The wheel speed information is coupled from reaction wheel control electronics 210 to an error vector generator 214. Error vector generator 214 generates an error vector $\Omega_e$ by matrix operations $$\Omega_e = (A^{-1}A - I)\Omega_m \qquad (1)$$

where
$\Omega_m$ is the n×1 measured wheel speed vector;
n is the number of reaction wheels;
A is the 3×n matrix for transforming a vector from wheel to spacecraft coordinates;
$A^{-1}$ is the n×3 pseudo-inverse of matrix A; and
I is the n×n identity matrix. The quantity in parenthesis within Equation 1 is the n×n error matrix.

The $\Omega_e$ signal generated by error vector generator 214 is applied to an integrator illustrated as a block 216 for generating an integrated signal $\Omega_i$.

The error vector $\Omega_e$ is applied to a wheel torque generator 218 together with $\Omega_i$ from integrator 216. Generator 218 linearly combines the wheel speed error vector $\Omega_e$ and the integrated signal $\Omega_i$ to produce the n×1 corrective wheel torque vector $T_{wc}$.

Attitude sensors 16, 18 of FIG. 2 apply attitude representative signals to an attitude controller illustrated as a block 220. Attitude control block 220 calculates the wheel torques which are required to maintain or assume the desired attitude, and produces torque command signals which are applied over a data path 222 to a first input port of a summing circuit 224. Corrective wheel torque vector $T_{wc}$ is applied from generator 218 to a second input of summing circuit 224 for summing together the torque commands and the corrective wheel torque vector to produce a torque drive signal which is applied to reaction wheel control 210.

In operation, attitude control circuit 220 responds to the attitude signals from attitude sensors 16, 18 and produces torque command signals which are modified by the wheel management arrangement including blocks 214, 216 and 218 for distributing the net reaction wheel momentum to each reaction wheel so that the total power is minimized. The modified torque command signals are applied as torque drive signals for driving the reaction wheels to the optimal speeds. The total torque applied to the spacecraft by the wheel speed management system is ideally zero. Operation of the reaction wheels represented by block 212 of FIG. 2 acts on the spacecraft dynamics illustrated as a block 226 for changing the spacecraft attitude, which in turn impacts upon the attitude sense by attitude sensors 16 and 18.

Figure 3:
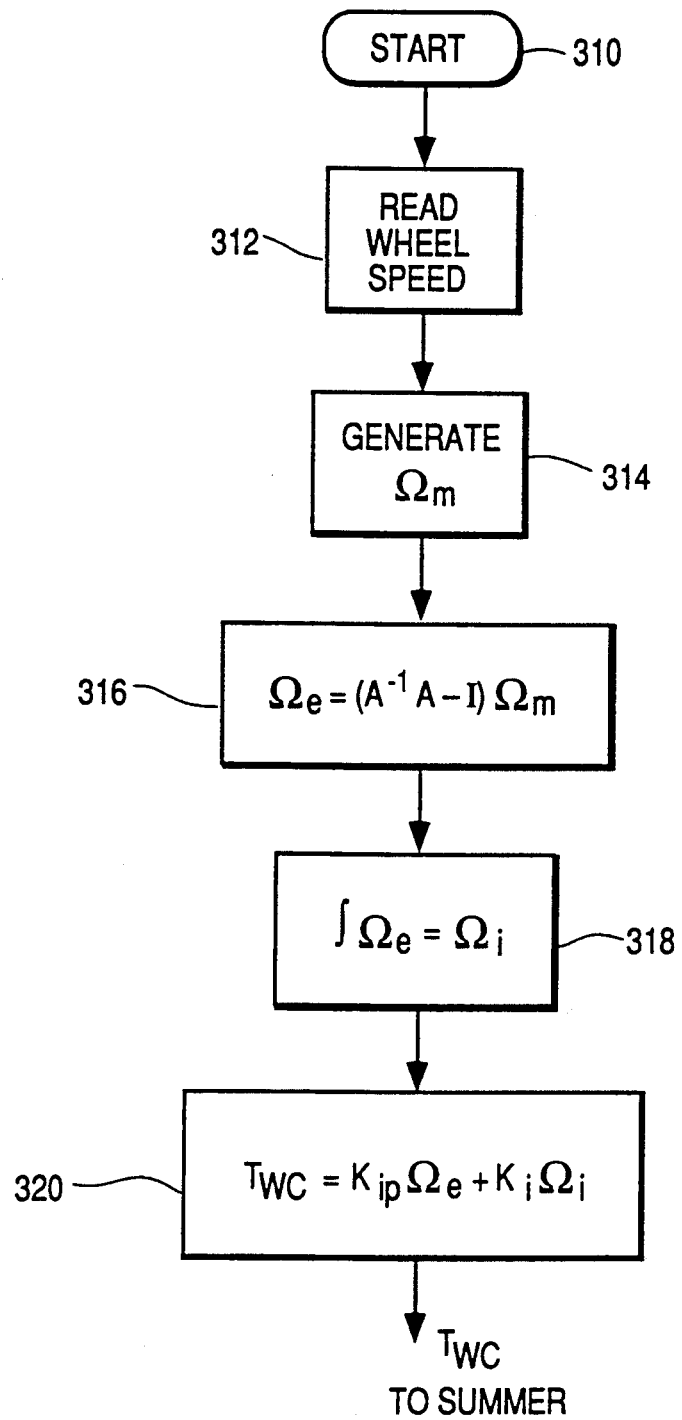
FIG. 3 is a simplified flow chart illustrating processing in accordance with the invention in the arrangement of FIG. 2.

FIG. 3 is a simplified block diagram illustrating the operation of controller 20 for generating corrective torque vector $T_{wc}$. In FIG. 3, the processing starts at a start block 310. From start block 310, the logic flows to a block 312 representing the reading of the wheel speeds. Block 314 represents a generation of the wheel speed vector $\Omega_m$, which is a n×1 vector of wheel speeds. From block 314, the logic flows to a block 316, representing the calculation of $\Omega_e$ pursuant to Equation 1. Block 318 represents the integration of $\Omega_e$ by the Euler system.

$$\Omega_i = \Omega_i + \Omega_e \qquad (2)$$

Block 320 represents the calculation of the corrective wheel torque vector $T_{wc}$ $$T_{wc} = K_p \Omega_e + K_i \Omega_i \tag{3}$$

Constants $K_p$ and $K_i$ are the $n \times n$ proportional and integral diagonal gain matrices, respectively. The off-diagonal elements of the proportional and integral diagonal gain matrices are zero. The proportional and integral gains, which are the diagonal elements of the gain matrices, are selected to assure that the wheel speed management system exhibits good performance and does not interact with the attitude control system. The gains for the $i^{th}$ wheel are calculated as $$K_{ii} = \frac{I_{wi} \omega_c^2 \Delta t}{\Gamma_i 64} \tag{4}$$

$$K_{pi} = \frac{I_{wi} \omega_c}{\Gamma_i 4} \tag{5}$$

where
  $I_{wi}$ is the inertia of the $i^{th}$ wheel;
  $\omega_c$ is the attitude control system crossover frequency;
  $\Delta t$ is the control system sample period; and
  $\Gamma_i$ is the $i^{th}$ diagonal element of the $n \times n$ wheel speed error matrix $(A^{-1}A - I)$.

FIGS. 4a, 4b, 4c and 4d are plots of the wheel speed error signals of a computer simulation of a spacecraft using four reaction wheels without a speed management system. The error signal is the difference between the actual wheel speed and the power optimal wheel speeds. Thus, the error signals represent excess wheel speed. Note that there are significant errors between the actual wheel speeds and the power optimal wheel speeds. The peak excess wheel speeds are greater than 6 rad/sec at about 7500 seconds.

FIGS. 5a, 5b, 5c and 5d correspond to FIGS. 4a, 4b, 4c and 4d, respectively, but for a spacecraft attitude control system in which the wheel momentum distribution is controlled by a wheel management system in accordance with the invention.

Figure 4:
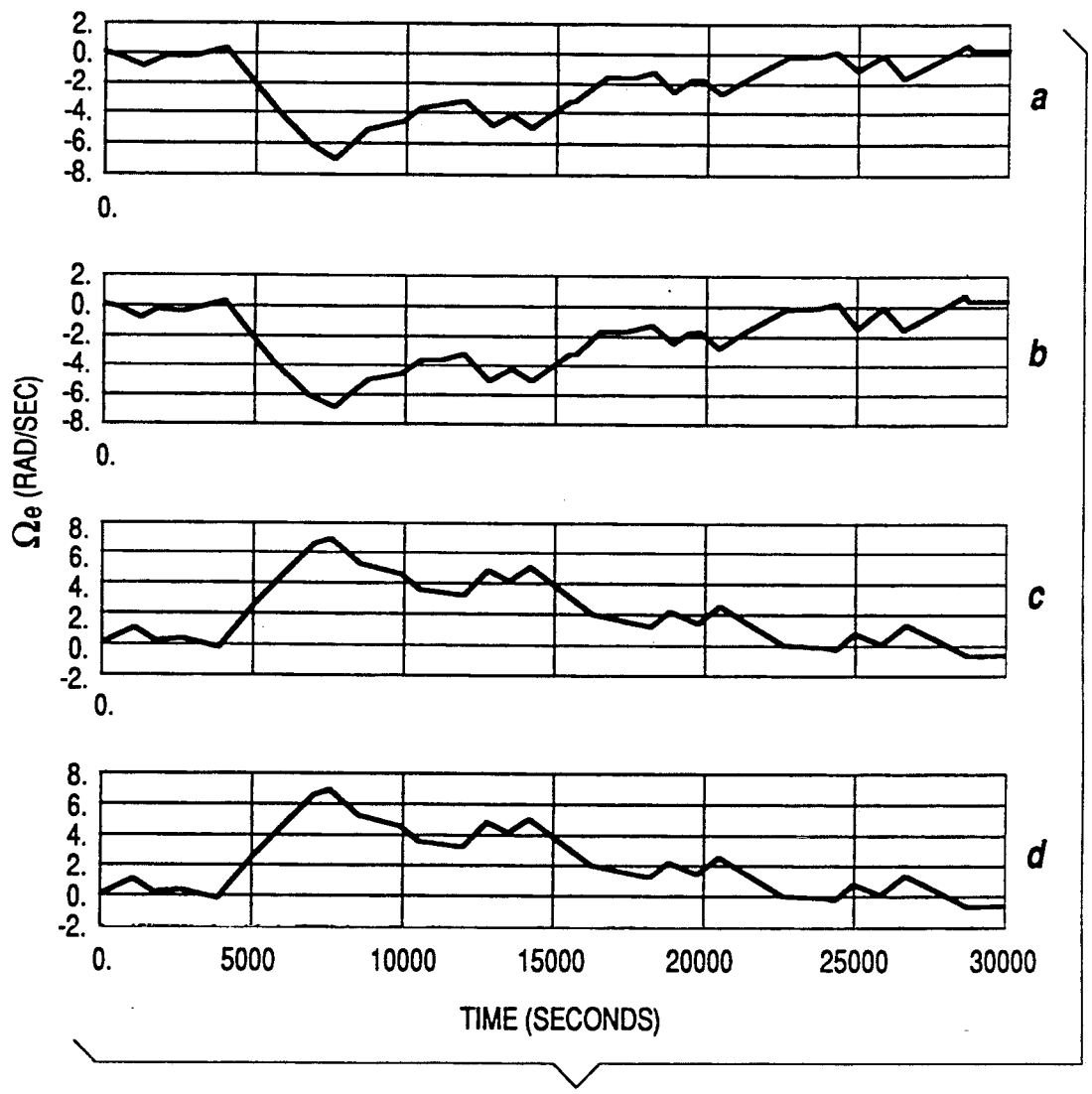
FIGS. 4a, 4b, 4c and 4d, referred to jointly as FIG. 4, are amplitude-time plots of the magnitude of the wheel speed error vector for a spacecraft without a wheel speed management system in accordance with the invention.

Note that the errors between the actual wheel speeds and the power optimal speeds are small in FIGS. 5a, 5b, 5c and 5d, in the range of 0.04 rad/sec, and represent very much smaller stored energies than those represented in FIG. 4. Thus, the excess energy stored in the wheels when managed according to the invention is so much smaller than that of the prior art that the power (energy per unit time) required for wheel drive with the invention is lower by comparison with the power required for the prior art control.

FIGS. 6a, 6b and 6c represent plots of the magnitude of the roll, pitch and yaw attitude error which result from the operation of the attitude control without a wheel speed management system.

Figure 5:
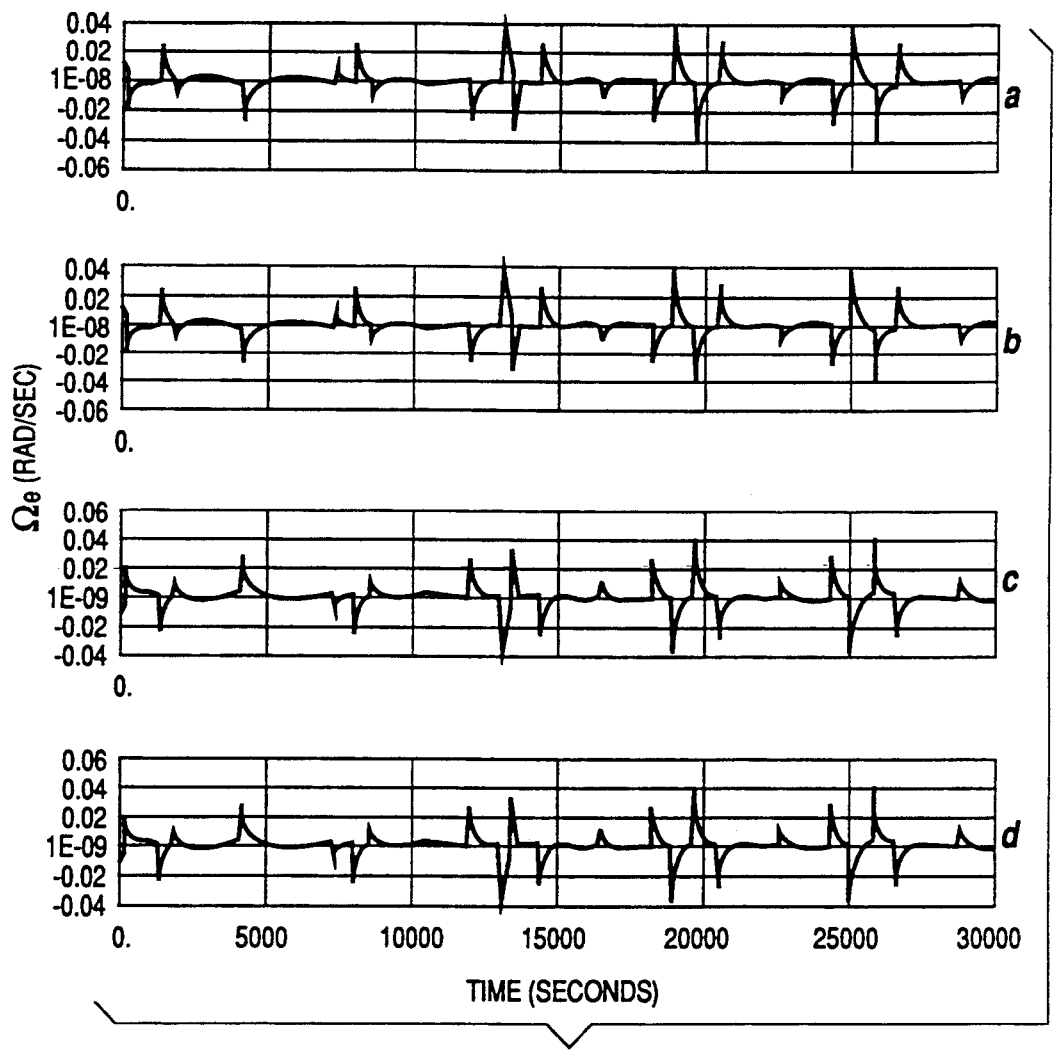
FIGS. 5a, 5b, 5c and 5d are plots similar to those of FIG. 4 for a spacecraft using wheel speed management in accordance with the invention.
Figure 6:
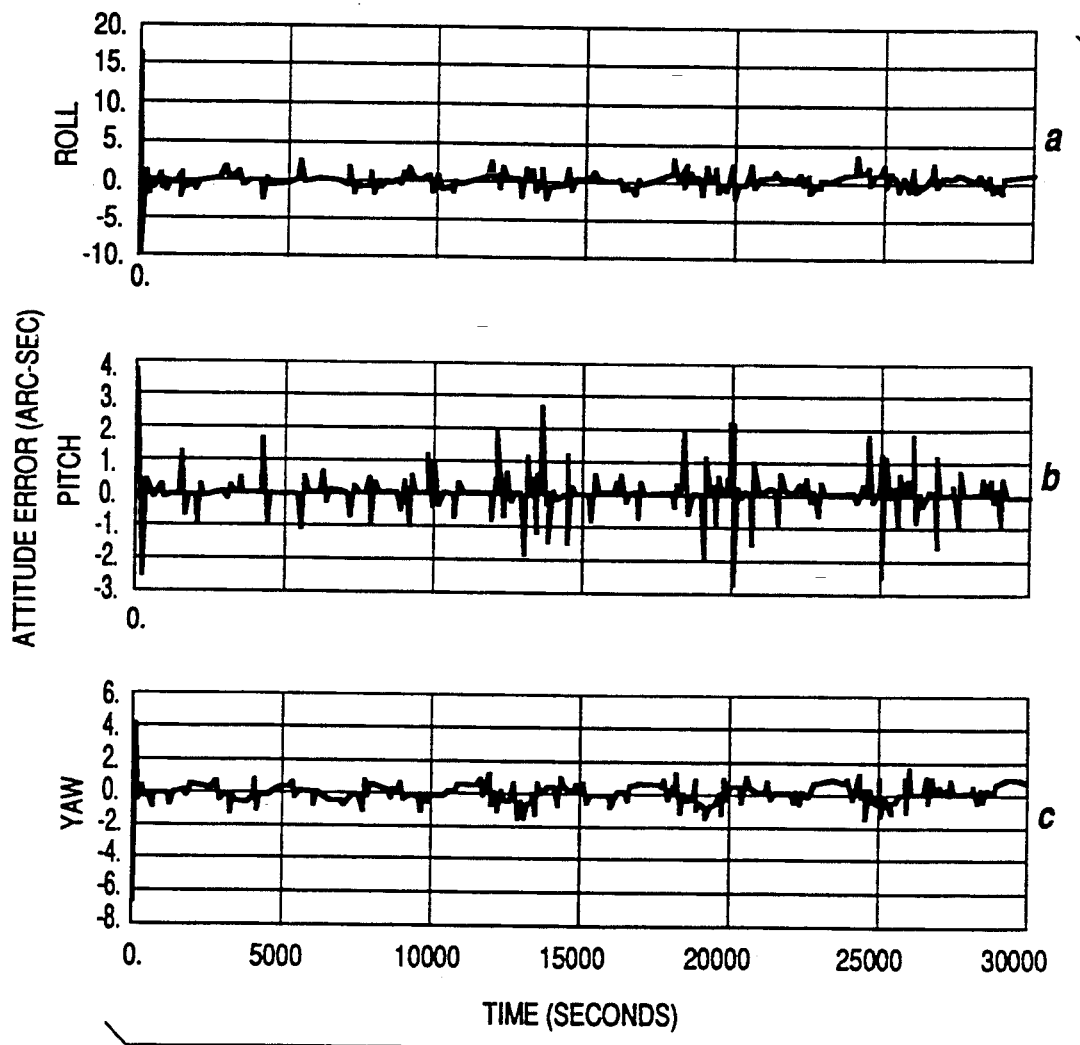
FIGS. 6a, 6b and 6c, referred to jointly as FIG. 6, illustrate the magnitude of the attitude error versus time about the roll, pitch and yaw axes, respectively, of a spacecraft without a wheel speed management system according to the invention.
Figure 7:
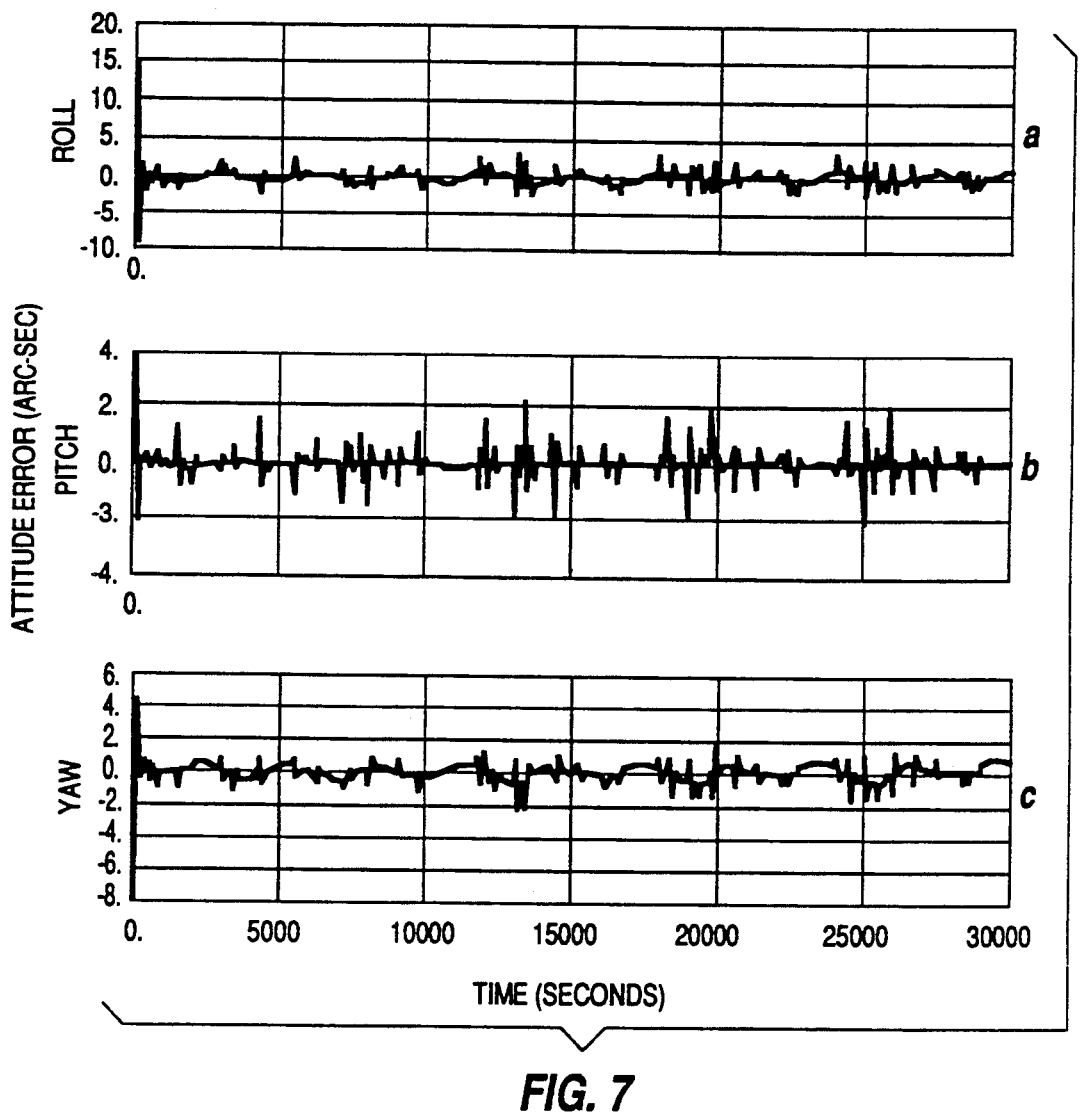
FIGS. 7a, 7b and 7c, are plots similar to those of FIG. 6 for a spacecraft using a wheel speed management system in accordance with the invention.

FIGS. 7a, 7b and 7c relate to FIGS. 5a, 5b and 5c in the same manner in which FIG. 6 relates to FIG. 4. The wheel management system in accordance with the invention drives the wheels to their power optimal speeds yet does not appreciably affect the peak magnitudes of the attitude errors, which can be noted most easily by comparison of FIG. 7 with FIG. 6.

Other embodiments of the invention will be apparent to those skilled in the art. The attitude sensors may be any sensors, either on or off the spacecraft, which produce pitch, roll and yaw signals. While four wheels have been illustrated and described, three of which are mutually orthogonal, any number of wheels greater than three, which may have different characteristics, and which may be in any orientation, can be used. The bandwidth associated with the wheel speed management system can be changed relative to that of the attitude control system.

What is claimed is:

1. A spacecraft, comprising:
    attitude control sensing means for generating attitude signals representative of spacecraft 3-axis attitude;
    at least four mutually skew reaction wheels adapted to receive torque drive signals for torquing said spacecraft under the control of said torque drive signals;
    attitude control means coupled to said attitude control sensing means for processing at least said attitude signals for generating torque command signals;
    coupling means coupled to said attitude control means and to said reaction wheels for translating signals from said attitude control means to said reaction wheels, whereby the speed of any one of said wheels may tend to exceed the power optimal value required to control said attitude, said coupling means comprising summing means including a first input data port coupled to said attitude control means for receiving said torque command signals, and also including a sum output port coupled to said wheels and further including a second input data port, said coupling means further comprising wheel speed control means coupled to said second input data port and also coupled to said means comprising (a) wheel speed error signal generator means coupled to said wheels and responsive to said wheel speeds for generating error signals representative of a wheel speed error vector, which error vector represents the difference between actual and power optimal speeds of said wheels, (b) integrating means coupled to said wheel speed error signal generator means for integrating said error signals to produce an integrated signal, and (c) processing means coupled to said wheel speed error signal generator means, to said second input data port of said summing means, and to said integrating means for processing said error signals and said integrated signals for producing wheel speed management signals in response to said wheel speeds, and for applying said wheel speed management signals to said second input data port, whereby said wheel speed management signals are summed with said torque command signals to produce said torque drive signals for control of said wheels to redistribute the momenta of said reaction wheels so that the total power is minimum.

2. A spacecraft according to claim 1, wherein said processing means comprises linear combining means for linearly combining said error signals and said integrated signals to generate said wheel speed management signals.

3. A method for controlling spacecraft attitude, comprising the steps of:
    sensing the attitude of said spacecraft to produce attitude signals;
    processing said attitude signals to produce torque control signals representative of the torques required to maintain said spacecraft 3-axis stabilized;
    spinning at least four mutually skewed reaction wheels mounted on said spacecraft in response to said torque control signals;

sensing the speed of said wheels to produce wheel speed signals;

processing said wheel speed signals to generate wheel speed management control signals representative of the deviation of said wheel speeds from power optimal values, wherein said wheel speed signals processing step comprises the further steps of (a) generating wheel speed error vector signals from said wheel speed signals and information relating to the dimension and orientation of said wheels, (b) integrating said wheel speed error vector signals to produce integrated signals and (c) processing said wheel speed error vector signals and said integrated signals together to generate said wheel speed management signals; and summing said wheel speed management signals with said torque control signals whereby said wheel speeds are maintained near said power optimal values.

4. A method according to claim 3 wherein said step of processing said wheel speed error vector signals and said integrated signals together comprises the step of combining said wheel speed error vector signals and said integrated signals.

5. A method according to claim 4, wherein in said step of combining, said wheel speed error vector signals and said integrated signals are combined with proportioned combining gains, and the proportional combining gains for the $i^{th}$ wheel are set to:

$$K_{pi} = \frac{I_{wi}\,\omega_c}{\Gamma_i^4}$$

where $I_{wi}$ is inertia of the $i^{th}$ wheel;

$\omega_c$ is the attitude control system crossover frequency; and $\Gamma_i$ is the $i^{th}$ diagonal element of the $n \times n$ wheel speed error matrix.

6. A method according to claim 4, wherein, in said step of combining, integral combining gain for the $i^{th}$ wheel, is set to $$K_{ii} = \frac{I_{wi}\,\omega_c^2\,\Delta t}{\Gamma_i 64}$$

where $\Delta t$ is the control system sample period.

* * * * *